(12) United States Patent
Marjakangas

(10) Patent No.: US 6,511,234 B1
(45) Date of Patent: Jan. 28, 2003

(54) SIGNAL TRANSMISSION METHOD AND MOTHERBOARD STRUCTURE

(75) Inventor: Jari Marjakangas, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/703,691

(22) Filed: Nov. 1, 2000

Related U.S. Application Data

(63) Continuation of application No. PCT/FI99/00389, filed on May 10, 1999.

(30) Foreign Application Priority Data

May 14, 1998 (FI) .................................................. 981079

(51) Int. Cl.$^7$ ................................................. G02B 6/36
(52) U.S. Cl. .............................. 385/88; 385/89; 385/49; 385/14
(58) Field of Search ........................ 385/14, 49, 88–94; 359/152, 154

(56) References Cited

U.S. PATENT DOCUMENTS

| | | | |
|---|---|---|---|
| 4,691,386 A | * 9/1987 | Eumurian et al. ............ 455/507 |
| 4,836,107 A |   6/1989 | Lang et al. |
| 5,054,870 A | * 10/1991 | Losch et al. .................... 385/14 |
| 5,221,984 A | * 6/1993 | Furuyama ...................... 359/154 |
| 5,296,748 A |   3/1994 | Wicklund et al. |
| 5,408,567 A | * 4/1995 | Hamilton ...................... 385/132 |
| 5,521,992 A | * 5/1996 | Chun et al. ..................... 385/14 |
| 5,818,619 A |   10/1998 | Medved et al. |
| 5,835,646 A | * 11/1998 | Yoshimura et al. ............ 385/14 |
| 5,978,526 A | * 11/1999 | Morikuni et al. .............. 385/14 |
| 6,259,832 B1 | * 7/2001 | Robertson ...................... 385/14 |
| 6,269,273 B1 | * 7/2001 | Miller ........................... 700/19 |

FOREIGN PATENT DOCUMENTS

| | | |
|---|---|---|
| EP | 0 476 569 | 3/1992 |
| EP | 0 617 314 | 9/1994 |
| GB | 2 257 260 | 1/1993 |
| WO | WO 90/09709 | 8/1990 |

OTHER PUBLICATIONS

International Search Report for PCT/FI99/00389.

* cited by examiner

*Primary Examiner*—Hemang Sanghavi
*Assistant Examiner*—Scott A Knauss
(74) *Attorney, Agent, or Firm*—Altera Law Group, LLC

(57) ABSTRACT

The invention relates to a signal transmission method and a motherboard structure used in a base station of a radio system, for example, and comprises printed circuit board units communicating with the motherboard structure and communicating with one another by signals. The motherboard structure comprises an optical fibre sheet having optical fibres arranged therein, first converter means receiving from the printed circuit board unit electrical low-power and high-frequency signals, such as clock signals and RF signals. The first converter means convert the received signals into optical signals, and each optical signal is conducted into an optical fibre of its own in the fibre sheet. The motherboard structure further comprises second converter means converting the optical signals which have propagated in the fibre sheet back into electrical signals which are conducted to the printed circuit board units after the conversion.

21 Claims, 1 Drawing Sheet

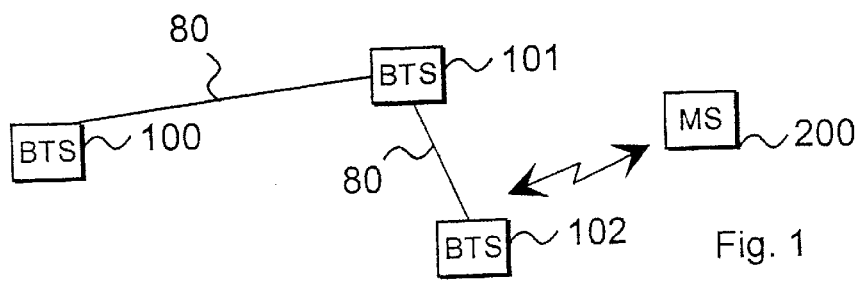
Fig. 1
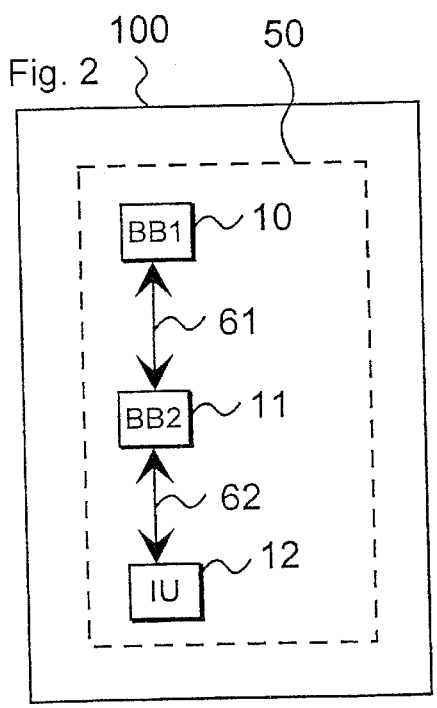
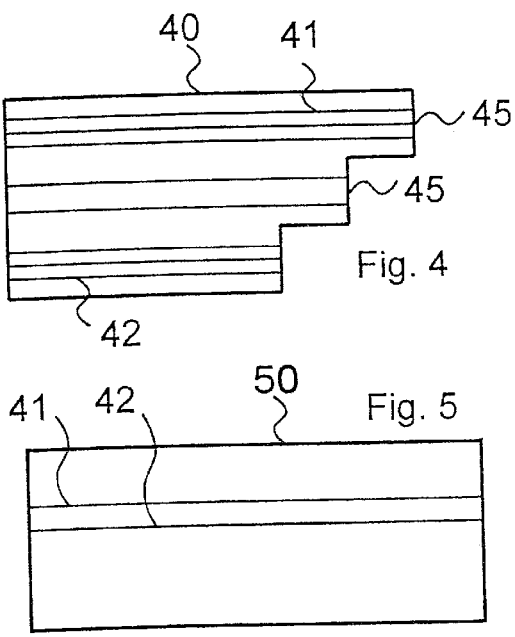
Fig. 4
Fig. 5
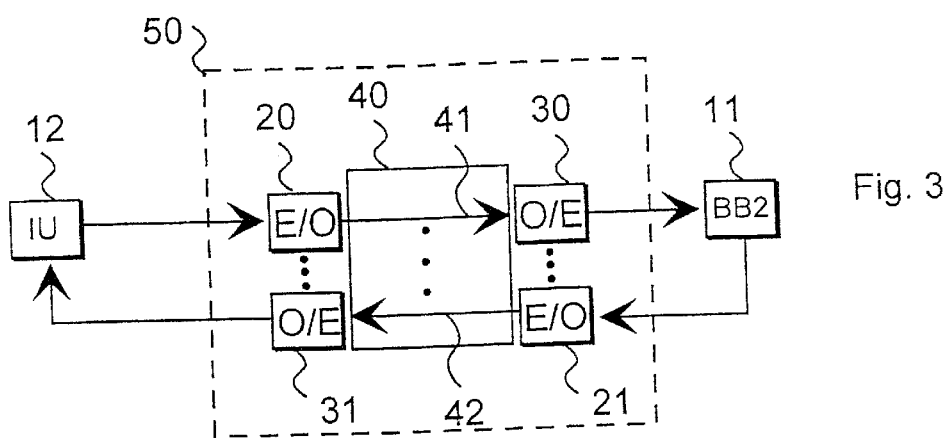
Fig. 3

SIGNAL TRANSMISSION METHOD AND MOTHERBOARD STRUCTURE

This application is a continuation of international application Ser. No. PCT/FI99/00389, filed May 10, 1999.

FIELD OF THE INVENTION

The present invention relates to a signal transmission method used in a base station of a radio system, for example, the base station being composed of a motherboard structure and printed circuit board units transmitting signals to one another.

BACKGROUND OF THE INVENTION

In prior art motherboard structures, units coupled to the motherboard structure communicate with one another by signals transmitted and received by the units. Generally, extremely high-frequency signals, such as clock signals,- which enable, for example, different units to be synchronized with one another, are transmitted through a motherboard structure. In addition, the units transmit RF signals to other units through a motherboard. Frequencies of high-frequency clock signals are reduced before they are transmitted to the motherboard, after which the clock frequency is again raised to the original value. However, changing the clock frequency to and fro may have caused frequency changes to the clock signal frequency.

Since a large number of different signals is transmitted through the motherboard, much wiring is needed thereon. However, space on the motherboard is restricted, for which reason designing the motherboard has become problematic. This inevitably results in dense wiring, and therefore signals transmitted along the wiring interfere, at least to some extent, with one another.

The aim has been to alleviate the above problems by conducting interfering signals to separate cables by which the motherboard is passed. However, in practice it is difficult and relatively expensive to use the cables. If separate cables have to be used frequently, signals to be transmitted along the cables also generate different types of interference. Furthermore, transmission capacity of long cables is not adequate enough for all applications. It has also been problematic to use the cables because of faulty couplings made at the installation stage of the cables and cracking of the cable insulating material at low temperatures.

BRIEF DESCRIPTION OF THE INVENTION

An object of the invention is thus to provide a method and a motherboard structure to solve the above problems. This is achieved by a method of the type presented in the introduction, which is characterized by when the printed circuit board units of the base station communicate with one another by signals which are transmitted through the common motherboard structure, of these signals converting into optical signals those with a low power and a high frequency, such as clock signals and RF signals and conducting each optical signal into an optical fibre of its own, each optical fibre being placed inside a fibre sheet attached to the motherboard structure, converting the optical signals that have propagated in the fibre sheet back into electrical signals and conducting each signal that has been converted into an electrical signal to the printed circuit board unit.

The invention also relates to a motherboard structure used in a base station of a radio system, for example, and comprises printed circuit board units communicating with the motherboard structure, the printed circuit board units communicating with one another by signals.

The motherboard structure of the invention is characterized in that the motherboard structure comprises an optical fibre sheet with optical fibres arranged therein, first converter means receiving from the printed circuit board units electrical low-power and high-frequency signals, such as clock signals and RF signals, and converting the received signals into optical signals, each optical signal being conducted into an optical fibre of its own in the fibre sheet, and second converter means converting the optical signals that have propagated in the fibre sheet back into electrical signals which are conducted to the printed circuit board units after the conversion.

The preferred embodiments of the invention are disclosed in the dependent claims.

The invention is based on the idea of using a fibre sheet in the motherboard structure of a base station and transmitting in the fibre sheet signals between the units arranged in the base station, which makes it possible to prevent the signals transmitted through the motherboard from causing interference on the motherboard.

The method and motherboard structure of the invention provide many advantages. An optical fibre sheet arranged in the motherboard enables the generation of electromagnetic interference, for example, to be reduced on the motherboard. When signals which probably generate interference are transmitted on the fibre sheet, the rest of the motherboard structure can be simplified. The use of the fibre sheet enables the layers of the printed circuit board to be reduced, which makes it is easier and faster to design the motherboard. Furthermore, thanks to fewer layers on the printed circuit board, the manufacturing costs of the motherboard become considerably smaller.

When the fibre sheet is used, different types of cables are not required, and therefore the risk of faulty couplings on the motherboard is eliminated. The use of the fibre sheet enables the size of the motherboard to be reduced. Furthermore, the fibre sheet is suitable for use in a wide range of temperatures. Since the structure of the fibre sheet differs widely from that of the cables, for example, the insulation material no longer becomes cracked at low temperatures. The use of a single fibre or a fibre sheet is also much more cost-effective than the use of the cables.

BRIEF DESCRIPTION OF THE DRAWINGS

In the following, the invention will be described in more detail by means of preferred embodiments with reference to the accompanying drawings, in which FIG. 1 shows base stations of a radio system, applying the method of the invention, FIG. 2 shows a motherboard structure arranged in the base station and having printed circuit board units coupled thereto, FIG. 3 shows the motherboard structure in more detail, FIG. 4 shows an optical fibre sheet, FIG. 5 shows a motherboard having optical fibres attached to its printed circuit board material.

DETAILED DESCRIPTION OF THE INVENTION

FIG. 1 shows a radio system comprising base stations 100, 101, 102 and a subscriber terminal 200. The base stations are interconnected with one another through a cable 80. When establishing a connection to another subscriber terminal, the subscriber terminal 200 transmits a connection-establishing signal first to the base station 102, for example, which transmits the connection-establishing signal further along the cable 80 to the base station 101, for example, through which the signal can be transmitted further to the desired subscriber station.

FIG. 2 shows a base station 100 comprising a motherboard structure 50. In addition, the base station comprises printed circuit board units 10, 11, 12 coupled to the motherboard structure. The units may be baseband units or interface units, for example. It is typical that each unit 10, 11, 12 carries out the task predetermined for the unit in question. The motherboard 50 acts as some kind of bus between the units attached to the motherboard. While carrying out their tasks, the different units forward a signal they have processed, for example, to another unit that is also coupled to the same motherboard 50. The units coupled to the same motherboard transmit a signal to one another through the motherboard structure.

It can be seen from the figure that the motherboard comprises a signal path 61 which at least partly connects the units 10 and 11. In addition, the motherboard comprises a signal path 62 which connects the units 11 and 12. In practice, the signal paths 61, 62 are implemented by optical connections, which enables interference on the signal path to be reduced.

FIG. 3 shows the motherboard structure 50 in more detail. The motherboard structure comprises an optical fibre sheet 40 having optical fibres 41, 42 arranged therein. The optical fibres in the fibre sheet form the above signal paths 61, 62. In addition, the motherboard structure comprises first converter means 20, 21 and second converter means 30, 31. The first and the second converter means are preferably located on the motherboard. The converter means can be implemented by prior art components by lasers, for example.

The first converter means 20, 21 receive electrical low-power and high-frequency signals from printed circuit board units. The above signals include clock signals and RF signals, for example. It can be seen from the figure that the first converter means 20 convert the electrical signal received from the unit 12 into an optical signal which is conducted into an optical fibre in the fibre sheet. Next, the optical signal is applied from the fibre sheet to the second converter means 30 which converts the optical signal into an electrical signal which is applied to the unit 11 after the conversion.

If the unit 11 needs to transmit high-frequency clock signals to the unit 12, the electrical clock signal is converted into an optical signal in the first converter means 21. Next, the optical signal is applied in the fibre 42 of the fibre sheet 40 to the second converter means 31. The second converter means 31 converts the optical signal transmitted by the first converter means into an electrical signal which is applied to the unit 12.

The first converter means 20, 21 convert the clock signals arriving from the printed circuit board units and having a frequency higher than 2 MHz into an optical signal. It is not necessary to convert signals having a frequency lower than 2 MHz into an optical signal, providing that the signals do not cause interference. In addition, the RF signals transmitted between the units are applied to the first converter means 20, 21. The converter means convert the signals having a power lower than 2 mW into optical signals.

The optical fibre sheet is preferably made of a flexible and thin material which remains unbreakable over a wide range of temperatures. The fibres of the fibre sheet are inside the fibre sheet, and therefore it is possible to reduce mechanical wear of the fibres, if any. The fibres can be placed in the fibre sheet side by side, for example. The fibre sheet can be attached on the surface of the motherboard with glue, for example. The converter means are placed on the motherboard in such a way that a signal which is supplied by the unit and passes from the converter means to the unit moves a shortest possible distance on the motherboard as an electrical signal. This makes it possible to further reduce the generation of interference.

The units communicating with the motherboard 50 typically have the same earth potential as the motherboard. This means that the use of the fibre sheet 40 in no way affects the earth potential of the units or the motherboard, but the signals which are converted from an electrical signal into an optical signal and the signals which are converted from an optical signal into an electrical signal have the same ground plane. Signals which have a higher power than 2 mW and earthing are conducted on the motherboard elsewhere than in the fibre sheet. The fibre sheet 40 can also be provided with an electrically conductive signal path through which a ground plane, for example, can be conducted to the desired destination.

As mentioned above, two or more base stations can be connected by the cable 80, preferably an optical cable. The cable 80 can be directly connected to a fibre of the fibre sheet 40. In that case the optical signal is converted into an electrical signal not until at a remote base station.

FIG. 4 shows an optical fibre sheet 40. FIG. 4 shows that the fibre sheet comprises several fibres 41, 42 which act as transmission paths for signals. Since the transmission paths in the fibre sheet 40 are not placed inside a thick insulating layer, an extremely large number of fibres can be disposed in one fibre sheet 40. The fibres are placed in a parallel direction in the fibre sheet, which enables as many fibres as possible to be placed in the fibre sheet 40. In the fibre sheet, not all fibres are of equal length, but some fibres extend to fibre sheet extensions 45. The signals can be transmitted as far as possible by means of the fibre sheet extensions 45, which enables interference to be reduced further.

FIG. 5 shows a motherboard 50 having optical fibres 41, 42 attached to its printed circuit board material. The optical fibres can be directly attached to the printed circuit board material of the motherboard with glue, for example. When the number of fibres is relatively small, the fibres can be directly attached on the surface of the motherboard as shown in FIG. 5. In that case the fibres attached to the printed circuit board material are apart from the fibre sheet. In other words, some of the fibres used on the motherboard can be placed in the optical fibre sheet and some can be directly attached to the motherboard. It is also possible to place the fibres between the layers of the printed circuit board.

Although the invention is described above with reference to the example according to the attached drawings, it is obvious that the invention is not restricted thereto, but it can be modified in many ways within the scope of the inventive idea disclosed in the attached claims.

What is claimed is:

1. A signal transmission method in a base station of a radio system, the base station comprising a motherboard structure and a first printed circuit board unit, and a second printed circuit board unit, each printed circuit board unit connected to the motherboard structure, the method comprising:

converting a high-frequency and low-power electrical signal Into an optical signal;

conducting the optical signal in an optical fiber between said first printed circuit board and second printed circuit board, the fiber being placed inside a fiber sheet attached to the motherboard structure;

converting the conducted optical signal back to an electrical signal;

transmitting a non-high-frequency and a non-low-power signal between the first and the second printed circuit board units via the motherboard structure.

2. The method as claimed in claim 1, wherein transmitting signals on the motherboard by means of the optical fibres attached to a printed circuit board material of the motherboard, the optical fibres being apart from the fibre sheet.

3. The method as claimed in claim 1, wherein converting the signals having a frequency higher than 2 MHz into optical signals.

4. The method as claimed in claim 1, wherein converting the signals having a power lower than 2 mW into optical signals.

5. The method as claimed in claim 1, wherein connecting the signals to be converted from electrical signals into optical signals and the signals to be converted from optical signals into electrical signals to the same ground plane.

6. The method as claimed in claim 1, wherein converting an electrical signal into an optical signal as close as possible to the unit that has transmitted the signal.

7. The method as claimed in claim 1, wherein converting an optical signal into an electrical signal as close as possible to the unit that receives the signal that has been converted into an electrical signal.

8. The method as claimed in claim 1, wherein carrying out the conversion of the signal into an optical signal and an electrical signal on the motherboard.

9. The method as claimed in claim 1, wherein transmitting the optical signal which has propagated in the fibre sheet into an optical cable communicating with a fibre of the fibre sheet, the cable being used for transmitting the optical signal to a different base station.

10. A motherboard structure in a base station of a radio system, the base station comprises a motherboard structure and a first printed circuit board unit, and a second printed circuit board unit, each printed circuit board unit connected to the motherboard structure, the structure comprising:

first converter means for converting a high-frequency and low-power electrical signal into an optical signal;

conductor means for conducting an optical signal in an optical fiber between said first printed circuit board and second printed circuit board, the fiber being placed inside a fiber sheet attached to the motherboard structure;

second converter means for converting the conducted optical signal back to an electrical signal;

transmitter means for transmitting a non-high-frequency and a non-low-power signal between the first and the second printed circuit board units via the motherboard structure.

11. The motherboard structure as claimed in claim 10, wherein that the motherboard structure comprises optical fibres in the printed circuit board material of the motherboard, the fibres being apart from the fibre sheet.

12. The motherboard structure as claimed in claim 10, wherein that the first converter means convert clock signals which arrive from the printed circuit board units and have a frequency higher than 2 MHz into optical signals.

13. The motherboard structure as claimed in claim 10, wherein that the first converter means convert signals having a power lower than 2 mW into optical signals.

14. The motherboard structure as claimed in claim 10, wherein that the first converter means are located as close as possible to the unit that has transmitted an electrical signal.

15. The motherboard structure as claimed in claim 10, wherein that the second converter means are located as close as possible to the unit that receives the signal that has been converted into an electrical signal.

16. The motherboard structure as claimed in claim 10, wherein that the signals to be converted from an electrical signal into an optical signal and the signals to be converted into an optical signal into an electrical signal have the same ground plane.

17. The motherboard structure as claimed in claim 10, wherein that the motherboard structure comprises an optical cable communicating with the fibre sheet, the optical cable transmitting the optical signal that has propagated in the fibre sheet to a different base station.

18. A signal transmission method In a base station of a radio system, the base station comprising a motherboard structure and a first printed circuit board unit, and a second printed circuit board unit, each printed circuit board unit connected to the motherboard structure, the method comprising:

converting a first clock-signal having a frequency higher than 2 MHz into an optical signal;

conducting said optical signal in an optical fiber between said first printed circuit board and second printed circuit board, the fiber being placed inside a fiber sheet attached to the motherboard structure;

converting the conducted optical signal back to an electrical signal;

transmitting a second clock-signal having a frequency lower than 2 MHz between the first and the second printed circuit board units via the motherboard structure.

19. A signal transmission method In a base station of a radio system, the base station comprising a motherboard structure and a first printed circuit board unit, and a second printed circuit board unit, each printed circuit board unit connected to the motherboard structure, the method comprising:

converting a first signal having a power lower than 2 mW into an optical signal;

conducting said optical signal in an optical fiber between the first printed circuit board unit and the second printed circuit board unit, the optical fiber being placed inside a fiber sheet attached to the motherboard structure;

converting the conducted optical signal back to an electrical signal;

transmitting a second signal having a power higher than 2 mW between the first and the second printed circuit board units via the motherboard structure.

20. A motherboard structure in a base station of a radio system, the base station comprises a motherboard structure and a first printed circuit board unit, and a second printed circuit board unit, each printed circuit board unit connected to the motherboard structure, the structure comprising:

a first clock signal having a frequency higher than 2 MHz is converted into an optical signal;

an optical fiber conducts said optical signal between said first printed circuit board and second printed circuit board, the fiber being placed inside a fiber sheet attached to the motherboard structure;

the conducted optical signal is converted back to an electrical signal;

a second clock signal having a frequency lower than 2 MHz is transmitted between the first and the second printed circuit board units via the motherboard structure.

21. A motherboard structure In a base station of a radio system, the base station comprises a motherboard structure and a first printed circuit board unit, and a second printed circuit board unit, each printed circuit board unit connected to the motherboard structure, the structure comprising:

a first signal having a power lower than 2 mW is converted into an optical signal;

an optical fiber conducts said optical signal between said first printed circuit board and second printed circuit board, the fiber being placed inside a fiber sheet attached to the motherboard structure;

the conducted optical signal is converted back to an electrical signal;

a second signal having a power higher than 2 mW is transmitted between the first and the second printed circuit board units via the motherboard structure.

* * * * *